United States Patent [19]

Stein et al.

[11] 4,356,385
[45] Oct. 26, 1982

[54] APPARATUS FOR PRECISELY REGULATING THE PARAFFIN TEMPERATURE IN AN ELECTRICALLY HEATED TISSUE PROCESSOR

[75] Inventors: Arthur A. Stein, Albany; Max Goldman, Latham, both of N.Y.

[73] Assignee: Pathology Products Ltd., Albany, N.Y.

[21] Appl. No.: 268,686

[22] Filed: Jun. 1, 1981

[51] Int. Cl.³ .......................................... H05B 3/06
[52] U.S. Cl. .................................. 219/441; 219/331; 219/435; 219/494; 219/513; 219/523
[58] Field of Search ............... 219/385, 386, 430, 433, 219/435, 438, 439, 441, 442, 494, 510, 512, 513, 521, 523, 331

[56] References Cited

U.S. PATENT DOCUMENTS

| | | | |
|---|---|---|---|
| 2,414,793 | 1/1947 | Colman | 219/523 |
| 2,824,942 | 2/1958 | Engelhardt et al. | 219/513 |
| 3,189,728 | 6/1965 | Schneider | 219/438 |
| 3,511,970 | 5/1970 | Kjellberg | 219/513 X |
| 4,307,287 | 12/1981 | Weiss | 219/442 |

FOREIGN PATENT DOCUMENTS 1515096  11/1969  Fed. Rep. of Germany ...... 219/441

OTHER PUBLICATIONS

SCR Manual, Sixth Edition, General Electric Co., p. 223.

*Primary Examiner*—Volodymyr Y. Mayewsky

[57] ABSTRACT

Apparatus for precisely regulating the paraffin temperature in an electrically heated tissue processor comprises a sensor which is detachably fastened to the tissue processor by a clamp so as to be partially immersed in the paraffin. A controller, coupled to the sensor, and coupled in series with the tissue processor heating element by a plug tap across a source of alternating current voltage, is responsive to the conduction state of the sensor and controls the delivery of power to the tissue processor heating element in accordance with the paraffin temperature as sensed by the sensor.

10 Claims, 3 Drawing Figures

APPARATUS FOR PRECISELY REGULATING THE PARAFFIN TEMPERATURE IN AN ELECTRICALLY HEATED TISSUE PROCESSOR

BACKGROUND OF THE INVENTION

This invention relates generally to electrically heated tissue processors of the wax pot type, and more specifically, to an apparatus for precisely regulating the temperature of molten paraffin in such a wax pot type tissue processor.

Biological analysis of human and animal tissue is often facilitated by immersing the tissue specimen in a bath of molten paraffin. When the tissue specimen is removed from the molten paraffin bath and the paraffin is allowed to cool and harden, the paraffin then acts to encapsulate the tissue specimen, thereby preventing oxidation and tissue spoilage. Electrically heated wax pot or paraffin bath tissue processors are commercially available for this purpose. Present day electrically heated wax pot type tissue processors typically comprise an open ended cavity for containing a quantity of paraffin which is heated to maintain the paraffin in its molten state by an electric heating element secured to the bottom of the paraffin-containing cavity. The heating element is energized from a source of alternating current through a bimetallic thermostatic switch affixed to the paraffin-containing cavity so as to be responsive to the temperature of the paraffin within the cavity. The bimetallic thermostatic switch is typically fabricated to become an open circuit, thus interrupting the energization of the heating element, when the cavity temperature reaches a predetermined magnitude, usually 60° C. (140° F.). Below this temperature, the bimetallic thermostatic switch remains closed, permitting the heating element to energize. In this way, the paraffin bath temperature is maintained substantially constant.

Generally, the bimetallic thermostatic switch of present day electrically heated wax pot type tissue processors is stable and reliable for the most part. However, repeated opening and closing of the bimetallic switch during prolonged tissue processor use eventually causes the switch contacts to arc and pit. Eventually, the continued pitting and arcing of the bimetallic thermostatic switch contacts causes the "trip" temperature of the bimetallic switch, that is the temperature at which the conduction state of the bimetallic thermostatic switch changes, to vary from a nominal temperature of 60° C. (140° F.). If, due to arcing and pitting of the bimetallic thermostatic switch contacts, the bimetallic thermostatic switch fails to change conduction states from a normally closed to open circuit when the temperature of the paraffin containing cavity rises above 60° C., but instead remains a closed circuit, then the heating element continues to remain energized, causing the paraffin temperature to rise above 60° C. Should a tissue specimen remain in the now-overheated paraffin bath for very long, it is likely that the tissue specimen will become "overcooked", that is to say, that the tissue specimen has been heated to a temperature which causes the specimen to become too dry and brittle for use. Once overcooked, a tissue specimen cannot be properly stained. Further, overcooked tissue specimens lose their hemotoxlyn binding and their nuclear toplanic differentiation, making such specimens almost useless for analysis purposes. Often the tissue specimen inadvertently destroyed by overcooking was obtained by surgical biopsy, making replacement of the now-destroyed tissue specimen very difficult, if not impossible. Therefore, precise regulation of the tissue processor paraffin temperature is crucial.

Accordingly, it is an object of the present invention to provide an apparatus for precisely regulating the temperature of paraffin heated in an electrically heated, wax pot type tissue processor;

It is yet another object of the present invention to provide an apparatus for precisely regulating the paraffin temperature of an electrically heated, wax pot type tissue processor which does not require modification of the tissue processor.

BRIEF SUMMARY OF THE INVENTION

Briefly, in accordance with the preferred embodiment of the invention, an apparatus for precisely regulating the temperature of paraffin heated in an electrically heated tissue processor comprises a sensor which takes the form of a mercury thermostat which is detachably secured to the tissue processor by a clamp so that at least a portion of the mercury thermostat is immersed in the paraffin. The mercury thermostat is responsive to the paraffin temperature and when the temperature of the paraffin rises above a predetermined temperature, typically 60° C. (140° F.), then the mercury thermostat changes conduction states from a normally open circuit to a closed circuit. A controller, which includes a solid state switch which takes the form of a triac, is coupled to the mercury thermostat and is responsive to the mercury thermostat conduction state. When the mercury thermostat is a normally open circuit, then the controller presents a low impedance circuit path for alternating current thereacross. Conversely, when the conduction state of the mercury thermostat changes to a closed circuit in response to a rise in the paraffin temperature above the predetermined temperature, then the controller presents a high impedance circuit path thereacross for alternating current. A plug tap, having each of its two contacts coupled to a separate one of the controller triac load terminals, detachably couples the controller in series with the tissue processor across an alternating current supply to enable the controller to regulate the power provided to the tissue processor in accordance with the paraffin temperature.

BRIEF DESCRIPTION OF THE DRAWINGS

The features of the invention believed to be novel are set forth in the appended claims. The invention itself, however, both as to method of organization and operation, together with further objects and advantages thereof, may best be understood by reference to the following description taken in conjunction with the accompanying drawings in which:

DETAILED DESCRIPTION OF THE PREFERRED EMBODIMENT

Figure 1:
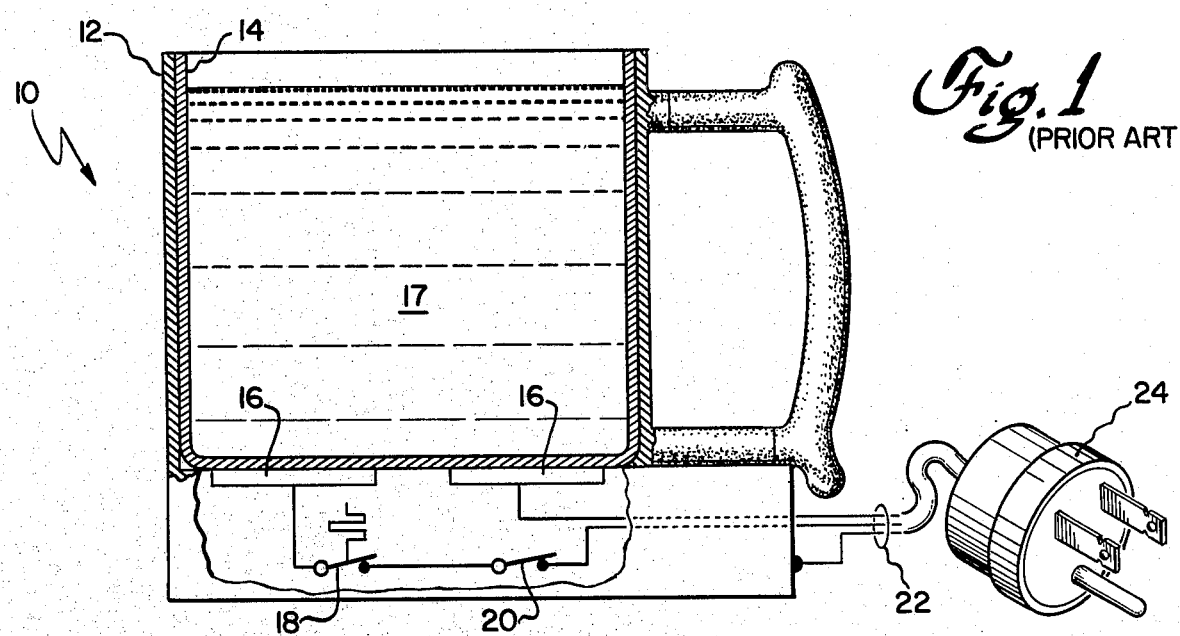
FIG. 1 is a front elevational view of an electrically heated wax pot type tissue processor according to the prior art.

FIG. 1 illustrates an electrically heated tissue processor of the wax pot type according to the prior art hereinafter identified by the reference numeral 10. Tissue processor 10 is configured of a hollow outer body 12 having a closed bottom and an open top. A second hollow body 14 having a closed bottom and open top is disposed within body 12 so that the open top of body 14 is in communication with the open top of body 12. Fastened to the bottom of body 14 within body 12 is an electric heating element 16, which, when energized with alternating current, heats body 14 to maintain the paraffin 17 contained within body 14 in a molten state. While paraffin 17 is maintained in its molten state by heating element 16, tissue specimens (not shown) may be immersed in the paraffin so that the paraffin, when it hardens following removal of the tissue specimen from body 14, will seal the tissue specimen, thereby preserving it.

Heating element 16 is coupled in series with a bimetallic thermostatic switch 18 and an on-off switch 20 across a source of a 110-120 volt, 50-60 Hertz source of alternating current by a three wire line cord 22 and a three wire grounding type plug 24 which is configured for insertion into a standard three wire outlet receptacle which carries 110-120 volt, 50-60 Hertz alternating current (not shown). The ground wire of line cord 22 connects body 12 of tissue processor 10 to the grounding blade of plug 24 so that when plug 24 is inserted into a three wire outlet receptacle, body 12 will be at ground potential.

In operation, when plug 24 is inserted into a three wire outlet receptacle which carries alternating current voltage and on-off switch 20 is closed, then an alternating current voltage is present across the series combination of bimetallic thermostatic switch 18 and heating element 16. Normally, when the temperature of body 14 is below the trip temperature of the bimetallic switch, then bimetallic thermostatic switch 18 is a closed circuit, allowing alternating current to pass through the switch to heating element 16, causing the heating element to heat body 14, causing the temperature of paraffin 17 contained therein to rise. Once the temperature of body 14 reaches the trip temperature of bimetallic thermostatic switch 18, then, the conduction state of bimetallic thermostatic switch 18 changes from a normally closed to an open circuit, interrupting the delivery of power to heating element 16. During intervals when the delivery of power to heating element 16 is interrupted, the temperature of body 14, and the temperature of paraffin 17 drop until the temperature of body 14 drops below the bimetallic thermostatic switch trip temperature, at which time, the bimetallic thermostatic switch becomes a closed circuit, permitting power again to be delivered to heating element 16.

The repeated opening and closing of bimetallic thermostatic switch 18, when the temperature of body 14 rises and falls above or below, respectively, the bimetallic thermostatic switch trip temperature, serves to maintain the temperature of paraffin 17 within body 14 at or about the trip temperature of bimetallic thermostatic switch 18, which, as indicated, is typically 60° C. However, should bimetallic thermostatic switch 18 fail to change conduction states from a normally closed to an open circuit when the temperature of body 14 rises above 60° C., as will sometimes be the case when the switch contacts become too pitted, then heating element 16 continues to remain energized, thus heating body 14 and paraffin 17 contained therein. Continued heating of paraffin 17 above 60° C. invariably causes any tissue specimens allowed to remain in the now-overheated paraffin, to become overcooked. As indicated earlier, once a tissue specimen becomes overcooked by remaining in an overheated paraffin bath for too long a time period, the tissue specimen becomes practically useless.

Figure 2:
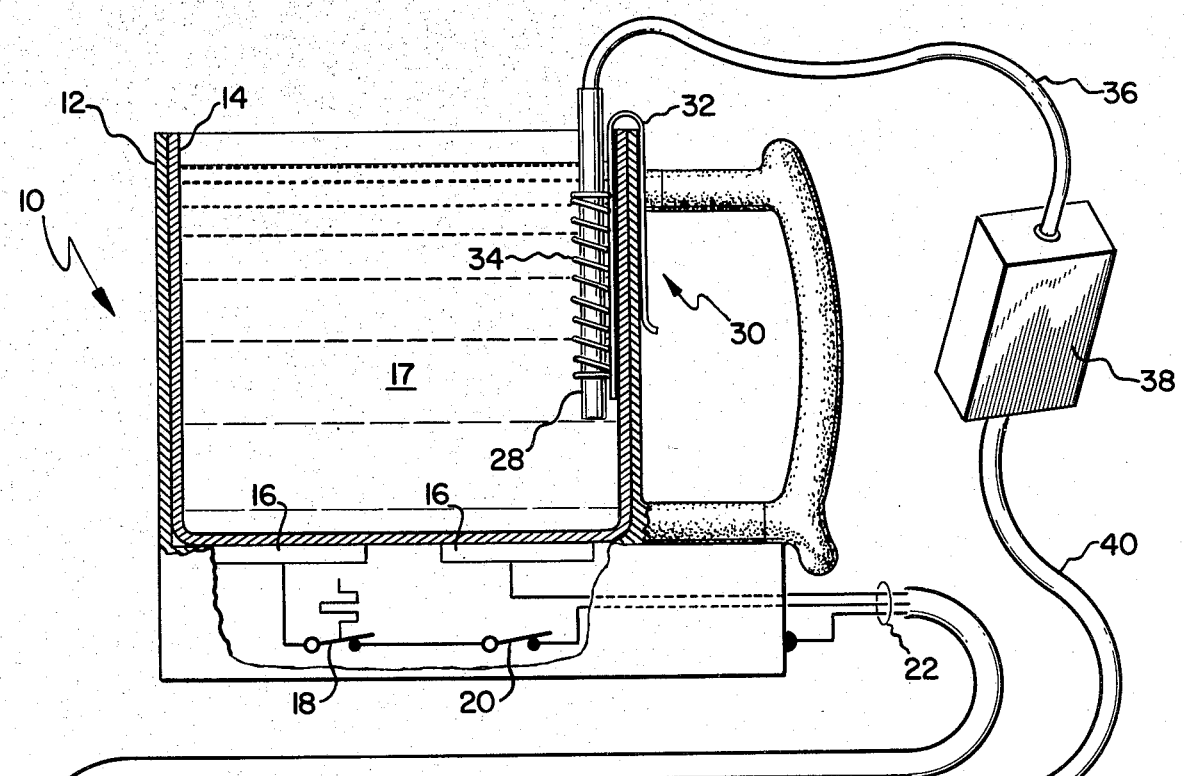
FIG. 2 is a front elevational view of an electrically heated wax pot type tissue processor according to the prior art coupled to the apparatus of the present invention for precisely regulating the temperature of paraffin heated in the tissue processor.
Figure 2:
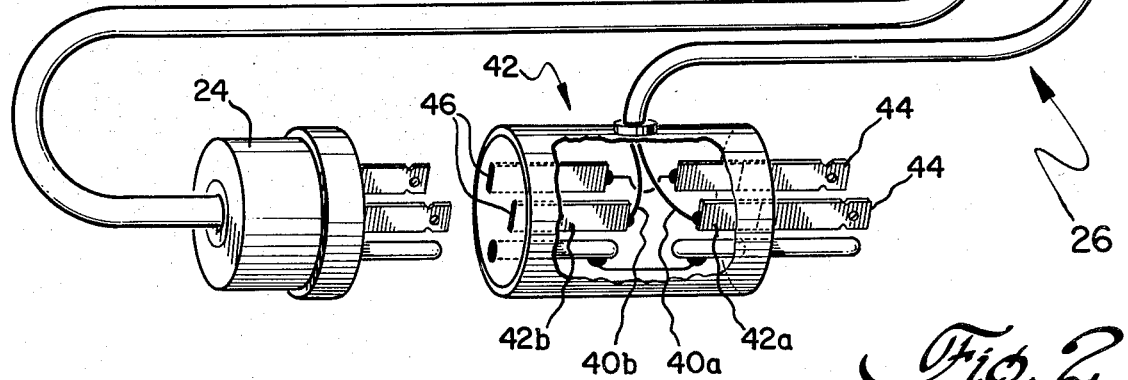

Referring now to FIG. 2, there is shown an electrically heated tissue processor of the wax pot type 10 which is configured identically to tissue processor 10 described with respect to FIG. 1. Coupled to tissue processor 10 of FIG. 2 is an apparatus 26 for precisely regulating the temperature of paraffin 17 heated in body 14 by heating element 16 of tissue processor 10. Apparatus 26 comprises a sensor 28 which takes the form of a mercury thermostat such as are available commercially from PSG Industries, Perkasie, Pa. or Princo Instruments, Southampton, Pa. Thermostat 28 is secured to tissue processor 10 so as to be partially immersed in paraffin 17 by a clamp 30 comprising a "U" shaped clip 32 which is inverted over the top of bodies 12 and 14 so that the sides of clip 32 extend vertically downwards to straddle the two bodies, and a spring 34 circumscribing the thermostat and fastened to the lower end of the side of clip 32 inside of body 14.

A two conductor cable 36, typically a twisted pair cable, connects thermostat 28 to a controller 38 which is coupled by another two conductor cable 40 to a plug tap 42, typically a model 5228 plug tap manufactured by Hubbell Co., so that each of conductors 40a and 40b of cable 42 is coupled to a separate one of contacts 42a and 42b of plug tap 42. Each of plug tap contacts 42a and 42b is connected to one of the contacts of a separate one of plug tap plug blades 44 and plug tap outlet receptacle 46, respectively, the remaining contact of plug tap outlet blades 44 being directly connected to the remaining contact of plug tap outlet receptacle 46. When a low impedance circuit path is coupled across plug tap contacts 42a and 42b, then, an alternating current will appear across the contacts of plug tap outlet receptacle 46 when plug tap plug blades 44 are inserted into an alternating current outlet. As will become better understood hereinafter, plug tap 42 facilitates detachable coupling of controller 38 in series with tissue processor 10 across a source of alternating current, thereby permitting controller 38 to control the temperature of the paraffin heated by the tissue processor. When controller 38 presents a low impedance circuit path across conductors 40a and 40b of cable 40, then plug tap 42 conducts alternating current to tissue processor 10. However, when controller 38 causes a high impedance circuit path to be present across conductors 40a and 40b, as will be the case when the conduction state of thermostat 28 changes, then plug tap 42 will de-energize the tissue processor.

Figure 3:
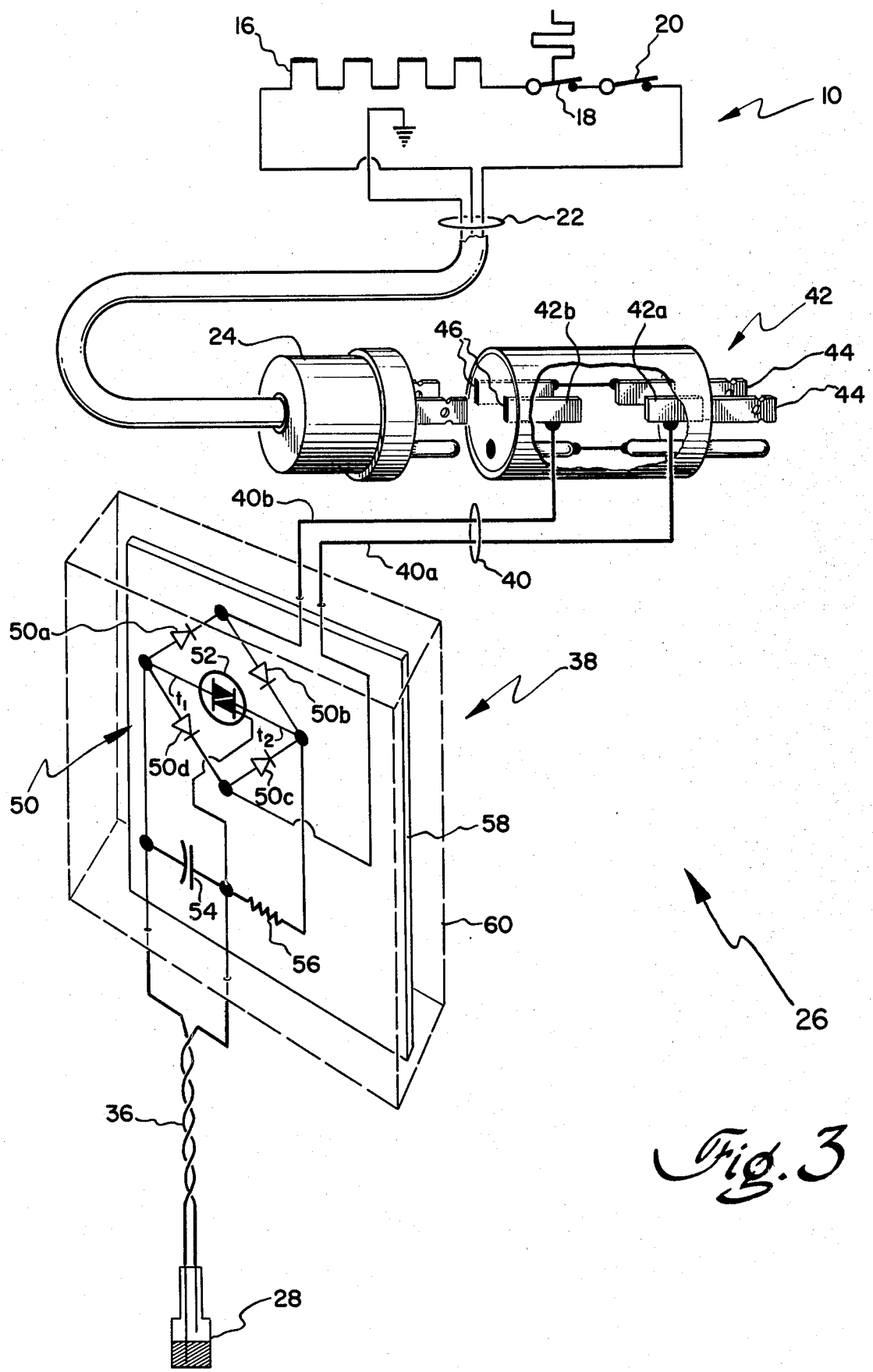
FIG. 3 is a schematic diagram of the controller comprising a portion of the apparatus of the present invention for precisely regulating tissure processor paraffin temperature illustrated in FIG. 2.

The schematic details of controller 38 are illustrated in FIG. 3. In the presently preferred embodiment, controller 38 includes a full wave rectifier bridge 50 configured of two pairs of diodes, 50a and 50d, and 50c, the diodes of each pair coupled in series-opposing fashion and the two pairs of diodes being coupled in parallel opposition across conductors 40a and 40b. A triac 52 is coupled with its load terminals $t_1$ and $t_2$ connected to the junction of the anode of diode 50a and the anode of diode 50d and the cathode of diode 50b and the cathode of diode 50c, respectively. A capacitor 54, typically 0.1, uf in value, and a resistor 56, typically 510 K ohms in value, are coupled in series across load terminals $t_1$ and $t_2$ of triac 52. As will become better understood hereafter, the capacitor and resistor form an RC network which serves to trigger triac 52 by forward biasing the triac gate coupled to the junction of the capacitor and resistor, with respect to triac load terminal $t_1$. The contacts of thermostat 28 are each coupled by a separate one of the two conductors of twisted pair cable 36 to a separate one of the contacts of capacitor 54 so that when the conduction state of thermostat 28 changes from a normally open to a closed circuit once the temperature of the paraffin in which thermostat 28 is immersed rises above the thermostat trip temperature, then capacitor 54 is shunted by the now closed thermostat.

The circuit components of controller 38, comprising diodes 50a–50d, triac 52, capacitor 54 and resistor 56, are mounted on a printed circuit board 58. Once it is fabricated, printed circuit board 58 is then encapsulated in a phenolic block 60 with cables 36 and 40 extending from opposite ends of block 60. Mounting of the controller components on a printed circuit board and then encapsulating the printed circuit board in a phenolic block assures virtually trouble free operation of the controller.

The operation of controller 38 will now be set forth with the initial assumption that on-off switch 20 of tissue processor 10 is closed and the paraffin temperature is below the trip temperature of both thermostatic switch 18 and thermostat 28 so that the former is normally closed and the latter is normally an open circuit. Under these conditions, when plug 24 of tissue processor 10 is inserted into plug tap receptacle 46 and the plug blades of plug tap 42 are inserted into a 110–120 volt 50–60 Hertz alternating current outlet receptacle, then, a rectified alternating current voltage appears across load terminals $t_1$ and $t_2$ of triac 52 and across the series combination of capacitor 54 and resistor 56. The voltage across the series combination of the capacitor and the resistor causes the capacitor to charge. When the capacitor stored charge reaches such a magnitude that the voltage across the capacitor equals or exceeds the break-over voltage of the triac, then the triac becomes conductive, causing a low impedance to be present across contacts 42a and 42b of plug tap 42. With a low impedance across plug tap contacts 42a and 42b, power is delivered to heating element 16 of tissue processor 10. Heating element 16, when powered with alternating current, heats the paraffin, causing the paraffin temperature to rise. So long as thermostat 28 and bimetallic thermostatic switch 18 remain open and closed, respectively, heating element 16 remains energized.

Eventually, the continued energization of heating element 16 causes the paraffin temperature to rise above the trip temperature of thermostat 18 and bimetallic thermostat 18. Thermostat 18, because of its fast response and immunity to arcing (because the current it carries is relatively low, typically 250, uAmps r.m.s.) will likely change conduction states before bimetallic thermostatic switch 18 once the paraffin temperature rises above the trip temperature and, when it does change conduction states from a normally open to a now-closed circuit, thermostat 28 short-circuits capacitor 54 so that the gate of triac 54 is no longer forward biased with respect to load terminal $t_1$. Once this occurs, then triac 52 becomes non-conductive, causing a high impedance to appear across plug tap terminals 42a and 42b. With a high impedance now preset across plug tap contacts 42a and 42b, no power is delivered to heating element 16. Once de-energized, heating element 16 no longer heats the paraffin and the paraffin temperature begins to fall. Once the paraffin temperature drops below the trip temperature, bimetallic thermostatic switch 18 becomes a closed circuit and thermostat 28 becomes an open circuit, permitting capacitor 54 to again charge. When the voltage across capacitor 54 equals or exceeds the triac break-over voltage, then the triac becomes conductive once again, permitting the heating element once again to draw power.

As will be appreciated by those skilled in the art, the load current drawn by heating element 16 is switched by the triac quite rapidly following a change in conduction state of thermostat 28. Since neither thermostat 28 nor triac 52 are subject to wear, in contrast to bimetallic switch 18, de-energization of the heating element is assured once the trip temperature of thermostat 18 is reached. The extreme accuracy of thermostat 28, typically $\pm 0.25°$ C. assures that paraffin temperature is precisely regulated by controller 38, thereby avoiding overcooking of tissue samples. Further, the interconnection of controller 38 with tissue processor 10 plug tap 42 allows external regulation of tissue processor paraffin temperature and thus obviates any need to modify the tissue processor which may void any manufacturer's warranty.

The foregoing describes an apparatus for precisely regulating the paraffin temperature in an electrically heated tissue processor.

It is believed that the invention in all of its phases has been fully described and it is desired to point out that the scope of this invention is believed to encompass many variations. It is therefore desired that the only limitations placed on the invention be the same as those set forth in the appended claims.

What is desired secure by United States Letters Patent is:

1. Apparatus for precisely regulating the temperature of paraffin heated in a electrically heated tissue processor comprising:
   a sensor responsive to the temperature of paraffin heated in the electrically heated tissue processor, said sensor changing from a first conduction state to a second conduction state when the temperature of paraffin heated in the electrically heated tissue processor rises above a predetermined temperature;
   clamp means for detachably fastening said sensor to the electrically heated tissue processor so that at least a portion of said sensor is immersed in the paraffin heated in the tissue processor;
   controller means electrically coupled to said sensor and being responsive to the conduction state of said sensor for providing a low impedance circuit path thereacross for alternating current during intervals while said sensor remains in its first conduction state and for providing a high impedance circuit path thereacross for alternating current during intervals while said sensor remains in its second conduction state following a rise in the temperature of paraffin heated in the electrically heated tissue processor above the predetermined temperature; and means coupled to said controller means for detachably coupling said controller means in series with the electrically heated tissue processor across a source of alternating current.

2. The invention according to claim 1 wherein said sensor comprises a mercury thermostat whose conduction state changes from a normally open circuit to a closed circuit when the temperature of paraffin heated in the electrically heated tissue processor rises above the predetermined temperature.

3. The invention according to claim 1 wherein said clamp means comprises:
a spring circumscribing the outer periphery of said sensor for retaining said sensor; and
a "U" shaped clip fastened to said spring for detachable engagement with the electrically heated tissue processor so that at least a portion of said sensor is immersed in the paraffin heated in the electrically heated tissue processor.

4. The invention according to claim 1 wherein said controller means comprises:
a first pair of diodes coupled in series-opposing fashion with the electrically heated tissue processor across a source of alternating current;
a second pair of diodes coupled in series opposing fashion, said second pair of diodes being coupled in parallel with said first pair of diodes;
a triac having a gate terminal, a first load terminal coupled to the junction between the diodes of said first pair of diodes and a second load terminal coupled to the junction between the diodes of said second pair of diodes;
a capacitor coupled between said first load terminal of said triac and said triac gate terminal;
a resistor coupled between said triac gate terminal and said second triac load terminal;
means for connecting said sensor across said capacitor;
a printed circuit board for securing said first and second pair of diodes, said triac, said capacitor and said resistor; and
a phenolic block encapsulating said printed circuit board.

5. The invention according to claim 1 wherein said means for coupling said controller in series with the electrically heated tissue processor across a source of alternating current comprises a plug tap.

6. In combination with an electrically heated tissue processor configured of a paraffin-containing cavity, a heating element affixed to the underside of the cavity for heating the paraffin contained therein when the heating element is energized with alternating current, a bimetallic thermostatic switch and a line cord having a plug at the end thereof for coupling the heating element and bimetallic switch across a source of alternating current, apparatus for precisely regulating the temperature of paraffin heated in the paraffin-containing cavity by the heating element, said apparatus comprising:
a sensor responsive to the temperature of paraffin heated in the paraffin-containing cavity by the heating element, said sensor changing conduction states from a first to a second state when the temperature of paraffin in the paraffin-containing cavity rises above a predetermined temperature;
clamp means for detachably securing said sensor to paraffin containing cavity so that at least a portion of said sensor is immersed in the paraffin in said paraffin-containing cavity;
controller means electrically coupled to said sensor and being responsive to the conduction state of said sensor for providing a low impedance circuit path thereacross for alternating current during intervals while said sensor remains in its first conduction state and for providing a high impedance circuit path thereacross for alternating current during intervals while said sensor remains in its second conduction state following a rise in paraffin temperature above said predetermined temperature; and
means coupled to said controller means for detachably coupling said controller means in series with the tissue processor heating element and bimetallic thermostatic switch across a source of alternating current.

7. The invention according to claim 6 wherein said sensor comprises a mercury thermostat whose conduction state changes from a normally open circuit to a closed circuit when the temperature of the paraffin in which said mercury thermostat is partially immersed rises above said predetermined temperature.

8. The invention according to claim 6 wherein said clamp means comprises:
a spring circumscribing the outer periphery of said sensor for firmly retaining said sensor; and
a "U" shaped clip fastened to said spring for detachable engagement with the paraffin-containing cavity of the tissue processor to position said spring so that a portion of said spring and a portion of said sensor are immersed in the paraffin contained in the paraffin-containing cavity.

9. The invention according to claim 6 wherein said controller means comprises:
a first pair of diodes coupled in series opposing fashion with the series combination of the tissue processor heating element and bimetallic switch across a source of alternating current;
a second pair of diodes coupled in series opposing fashion, said second pair of diodes being coupled in parallel opposition with said first pair of diodes;
a triac having a gate terminal, a first load terminal coupled to the junction between diodes of said first pair of diodes, and a second load terminal coupled to the junction between diodes of said second pair of diodes;
a capacitor coupled between said first triac load terminal and said triac gate terminal;
a resistor coupled between said triac gate terminal and said second triac load terminal;
means for coupling said sensor across said capacitor;
a printed circuit board to which said first and second pair of diodes, said triac, said capacitor and said resistor are secured; and
a phenolic block encapsulating said printed circuit board.

10. The invention according to claim 6 wherein said means for detachably coupling said controller means in series with the tissue processor heating element and thermostatic switch across a source of alternating current comprises a plug tap.

* * * * *